United States Patent [19]

Sakata et al.

[11] Patent Number: 5,150,511
[45] Date of Patent: Sep. 29, 1992

[54] METHOD FOR MANUFACTURING A MAGNETIC TRANSDUCER HEAD

[75] Inventors: Katsumi Sakata; Tatsuo Kumura; Atsushi Suzuki; Yoshito Ikeda; Kaoru Aoki; Naoto Kojima, all of Miyagi; Akio Mishima, Kanagawa, all of Japan

[73] Assignee: Sony Corporation, Tokyo, Japan

[21] Appl. No.: 708,388

[22] Filed: May 31, 1991

[30] Foreign Application Priority Data

May 31, 1990 [JP] Japan .................................. 2-143093

[51] Int. Cl.⁵ .............................................. G11B 5/42
[52] U.S. Cl. ...................................... 29/603; 360/121
[58] Field of Search .................. 29/603; 360/119–121, 360/122, 127

[56] References Cited

U.S. PATENT DOCUMENTS

| 3,494,026 | 2/1970 | Sugaya | 29/603 |
| 3,672,045 | 6/1972 | Robertson | 29/603 |
| 4,815,197 | 3/1989 | Ota et al. | 29/603 |

OTHER PUBLICATIONS

Patent Abstracts of Japan, Published Apr. 26, 1989, Muraoka Shunsaku–"Magnetic Head".

Primary Examiner—Carl E. Hall
Attorney, Agent, or Firm—Hill, Van Santen, Steadman & Simpson

[57] ABSTRACT

A method for manufacturing a magnetic transducer head in which a track width regulating grooves provided on both edges of a magnetic gap are filled by blowing a powder beam of nonmagnetic material having a very tine particle size to deposit the nonmagnetic material in the grooves. A pair of magnetic core members are bonded together to form a magnetic gap therebetween by providing a metal layer of a bonding surface of the core members and applying a pressure to the core members under an elevated temperature to cause a mutual diffusion of the metal to bond the core members together. Thus the magnetic transducer head can be made without using a high-temperature heat treatment.

18 Claims, 6 Drawing Sheets

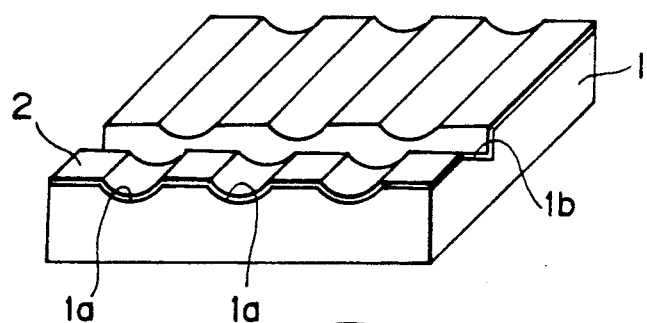
FIG. IA
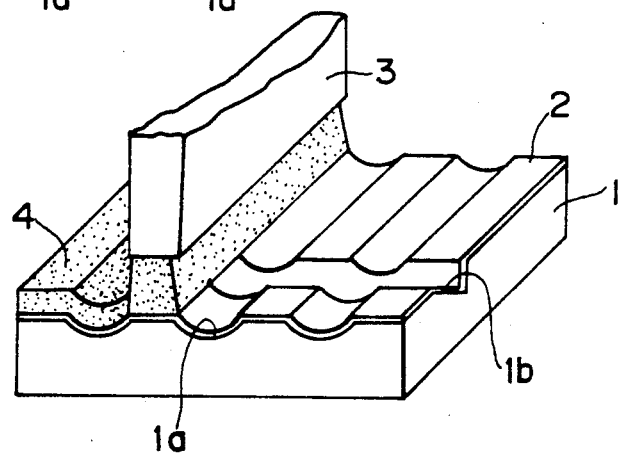
FIG. IB
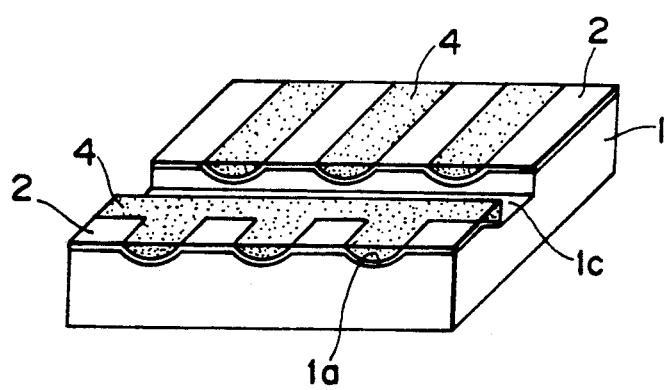
FIG. IC
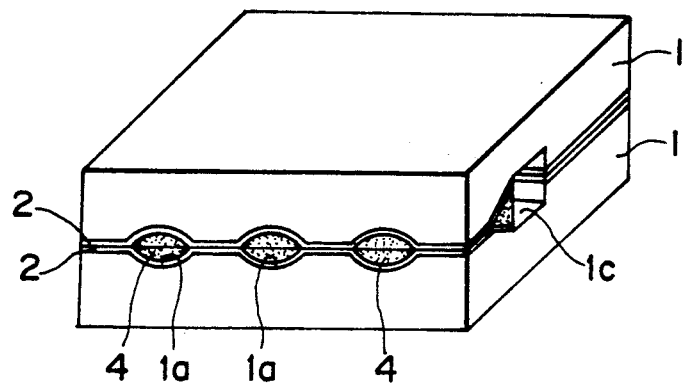
FIG. ID

METHOD FOR MANUFACTURING A MAGNETIC TRANSDUCER HEAD

BACKGROUND OF THE INVENTION

The present invention relates to a method for manufacturing a magnetic transducer head and more particularly to a method including a deposition process for non-magnetic material to fill grooves defining a track width of the head.

Recently, a bonding method utilizing low-temperature metal diffusion has been developed, and efforts have been made to apply the bonding method primarily to bonding magnetic core members together to form a gap in manufacturing a magnetic head.

The use of low-temperature metal diffusion eliminates a high-temperature heating process such as the fusion of glass, and makes possible the utilization of amorphous magnetic alloys having low heat resistance for forming a so-called metal-in-gap type magnetic head.

When low temperature metal diffusion is used for bonding magnetic core members to form a gap, filling track width regulating grooves with a nonmagnetic material is a problem.

In an ordinary video head, a core (a portion of a magnetic head that is brought into sliding contact with a magnetic recording medium) is formed, in general, in a width greater than the track width in view of abrasion resistance, and the magnetic core is provided with grooves for regulating the track width. When the magnetic core members are bonded together by the fusion of glass to form a gap, the grooves are filled with the glass. When the magnetic core members are bonded together by low-temperature metal diffusion, the grooves, form void spaces. Such void spaces may possibly damage a magnetic tape or may possibly spoil the contact between the magnetic head and the magnetic tape.

Such a problem may be solved by filling up the void spaces with glass after bonding together the magnetic core members to form a magnetic core, which however, requires heating the magnetic core to a temperature which is high enough to melt flow a glass. Therefore, it is impossible to use an amorphous alloy having a low temperature of crystallization if a reliable glass having a high melting point is used for filling up the void spaces, and the advantage of low-temperature metal diffusion is nullified.

The use of a glass having a low melting point may be effective to make the most of the advantage of low-temperature metal diffusion. However, such a glass is not satisfactory in reliability and will cause partial abrasion. Even if a glass having a low melting point is employed, the magnetic core needs unavoidably to be heated at a comparatively high temperature, and only limited magnetic metals can be used.

Filling the track width regulating grooves with glass requiring a high-temperature heating process imposes many restrictions on the selection of materials for a magnetic head, and hence it is impossible to make the most of the advantage of lo temperature metal diffusion in combination with filling the track width regulating grooves with glass. Furthermore, it is possible that the use of fused glass for filling up the voids entails partial abrasion due to the poor abrasion resistance of the glass, regardless of whether or not the magnetic core members are bonded together by low-temperature metal diffusion.

OBJECT AND SUMMARY OF THE INVENTION

It is an object of the present invention to provide a method of manufacturing a magnetic transducer head having a superior abrasion resistance.

It is another object of the present invention to provide a method for manufacturing a magnetic transducer head free of a high-temperature heat treatment which affects the magnetic characteristics of a soft magnetic material.

According to one aspect of the present invention, there is provided a method for manufacturing a magnetic transducer head, in which a pair of magnetic core members are bonded together to form a magnetic gap therebetween. The magnetic gap has a width corresponding to a recording track width on a travelling magnetic recording medium, and the width is smaller than a thickness of the magnetic core members. Thus there are provided a pair of grooves on the magnetic core members for regulating the width of the gap on both ends of the gap which are filled by nonmagnetic material. The filling of nonmagnetic material is carried out by blowing a powder beam of nonmagnetic material to cause deposition of the nonmagnetic material in the groove. The gap is formed by bonding the core member having a metal layer therebetween and applying a pressure under an elevated temperature to cause diffusion of the metal. The process is free of high-temperature heat treatment and avoids any drawbacks caused by a soft magnetic metal layer used as a part of the core members.

BRIEF DESCRIPTION OF THE DRAWINGS

FIGS. 1A to 1D are schematic perspective views for assisting in explaining steps of a magnetic head manufacturing method in a first embodiment according to the present invention;

DESCRIPTION OF THE PREFERRED EMBODIMENTS

Figure 2:
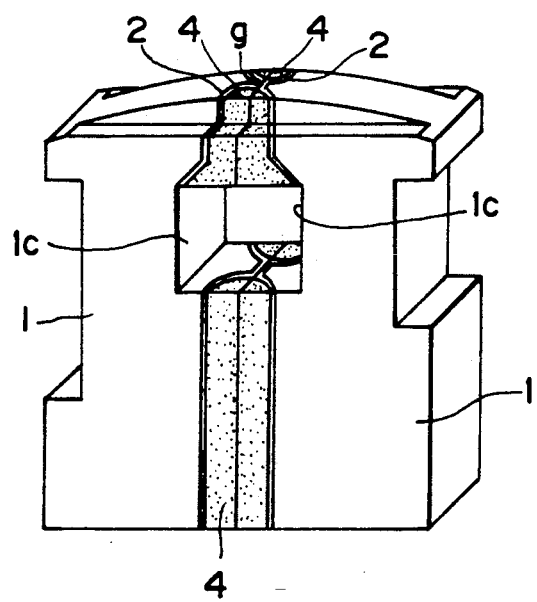
FIG. 2 is a schematic perspective view of a magnetic head manufactured by the magnetic head manufacturing method in the first embodiment.

In the present invention, the track width regulating grooves provided on both sides of a magnetic gap are filled by deposition of a filler by applying a powder beam of nonmagnetic filler material. By applying the powder beam under a certain condition explained hereinafter, the grooves are filled by the deposition of the material forming the powder beam.

Preferred embodiments of the present invention will be described hereinafter.

Example 1

A magnetic head manufacturing method in a first embodiment according to the present invention comprises filling up track width regulating grooves formed previously in substrates 1 formed of ferrite or the like with a nonmagnetic particulate by blowing, and then bonding the substrates 1 together by low-temperature metal diffusion to form a hap.

Referring to FIG. 1A, track width regulating grooves 1a and a coil groove 1b are formed in each substrate 1 formed of, for example, magnetic ferrite, and then a soft magnetic metal thin film 2, such as a thin film of an amorphous magnetic alloy, is formed over the joining surface of each substrate 1 by a vacuum thin-film forming process, such as a sputtering process, or a plating process. The soft magnetic metal thin film 2 may be formed of a known material, such as CoZr, CoNb amorphous magnetic alloy, a soft magnetic two-phase amorphous alloy, an Fe-N soft magnetic metal or a crystalline soft magnetic alloy, such as Fe-Al-Si, Fe-Ge-Si or Fe-Ga-Si-Ru.

Then, as shown in FIG. 1B, a nonmagnetic material 4 is blown through a nozzle 3 having a rectangular nozzle exit to fill up the track width regulating grooves 1a and the coil groove 1b with the nonmagnetic material.

The most significant feature of the magnetic head manufacturing method is the use of particles of the nonmagnetic material having an average particle size in the range of 0.01 to 3 $\mu$m. Such submicron particles cause a phenomenon which has never been experienced on the surface of a workpiece. Assuming the angle of incidence of the submicron particles on the surface is in the range of 0° to 10°, the submicron particles are deposited on the surface of the workpiece.

The nonmagnetic material 4 may be of any kind provided that the nonmagnetic material can be reduced to particles. Exemplary possible nonmagnetic materials are oxides, such as alumina and $SiO_2$, nitrides and carbides. Nonmagnetic materials having a low melting point, such as lead glass, may also be used. In view of abrasion resistance, a nonmagnetic material having a high hardness is preferable.

A blowing apparatus for filling the track width regulating grooves 1a and the coil groove 1b with the nonmagnetic material 4 by blowing will be described hereinafter by way of example.

The blowing apparatus comprises, as principal components, an air compressor 101 for supplying compressed air, a mixing tank 102 in which the compressed air discharged from the air compressor 101 and submicron particles are mixed, a deposition vessel 103 for depositing the submicron particles on the surface of a workpiece 136 by blowing the mixture of the submicron particles and the compressed air against the surface of the workpiece 136, and an exhauster 104 for recovering the submicron particles contained in the mixture discharged from the deposition vessel 103.

An air supply pipe 105 has one end connected to the air compressor 101 and the other end branched into a first air supply pipe 106 and a second air supply pipe 107. Both the first air supply pipe 106 and the second air supply pipe 107 are connected to the mixing tank 102. The air supply pipe 105 is provided with a pressure regulating valve 108 for regulating the pressure of the compressed air supplied to the mixing vessel 102, and a solenoid valve 109 for controlling the supply of the compressed air to the mixing tank 102. The second air supply pipe 107 is provided with a flow regulating valve 110 for regulating the flow of the compressed air through the second air supply pipe 107.

A hopper 111 containing submicron particles is disposed on top of the mixing tank 102. The submicron particles are supplied through an opening normally closed by a cover 112.

As mentioned above, the average particle size of the submicron particles is about 3 $\mu$m or less.

Figure 3:
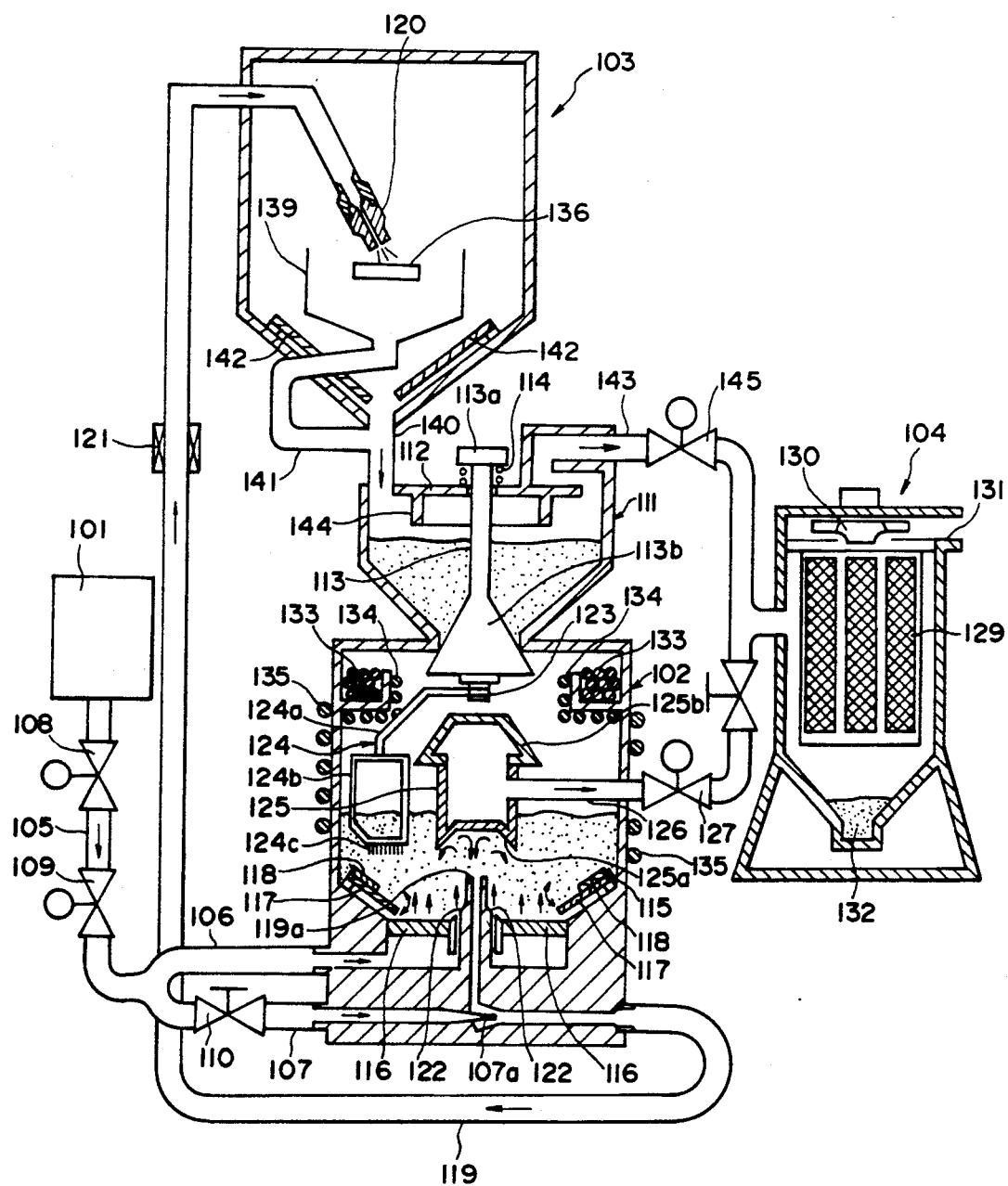
FIG. 3 is a schematic sectional view of a blowing apparatus for blowing a nonmagnetic material.

The hopper 111 has a funnelform bottom wall provided with a charging opening 111a in its central portion. The submicron particles are charged through the charging opening 111a into the mixing tank 102. A conical valve element 113 having a stem is fitted in the charging opening 111a. The stem of the valve element 113 extends through the central portion of the cover 112, and a stopper 113a is attached to the extremity of the stem of the valve element 113. A coil spring 114 is disposed between the stopper 113a and the cover 12 to bias the valve element 113 upward as viewed in FIG. 3 so that the circumference of the conical portion 113b of the valve element 113 is normally in close contact with the lower edge of the bottom wall of the hopper 111 to keep the charging opening 111a closed. When necessary, the valve element 113 is depressed against the resilience of the coil spring 114 to separate the conical portion 113b from the lower edge of the hopper 11 to open the charging opening 111a to let the submicron particles contained in the hopper 111 fall into the mixing tank 102.

The mixing tank 102 is a cylindrical vessel containing the submicron particles 115. The mixing tank 102 has a funnelform bottom wall provided at its lower end with a cermet filter disk 116 (a porous disk having numerous pores formed by sintering a metal powder). The first air supply pipe 106 connected to the air compressor 101 is connected to the mixing tank 102 on the side of the backside of the filter disk 116 to supply the compressed air through the first air supply pipe 106 and the filter disk 116 into the mixing tank 102.

A plurality of vibrators 117 are arranged around the filter disk 116 on the inclined inner circumference of the funnelform bottom wall of the mixing tank 102 with their free ends positioned above the filter disk 116 and with their base ends fixed to the funnelform bottom wall of the mixing tank 102. Each vibrator 117 is, for example, a bimorph device having a pair of piezoelectric elements disposed one over the other, and electrodes.

When an ac voltage is applied to the vibrators 117, the free ends of the vibrators 117 vibrate vertically to disperse the submicron particles 115 mechanically so that the submicron particles 115 and the compressed air supplied through the filter disk 116 into the mixing tank 102 are mixed. The frequency of the ac voltage applied to the vibrators 117 may be a high frequency in the range of 200 to 400 Hz. Desirably, the frequency of the ac voltage is approximately equal to the resonance frequency of the bimorph devices. Driving the adjacent vibrators 117 respectively in opposite phases of vibration enhances the effects of the vibrators 117.

The base ends of the vibrators 117 are covered with a rubber sheet 118 to prevent the submicron particles 115 from clogging the spaces under the vibrators 117 so that the vibration of the vibrators 117 is not obstructed.

A feed pipe 19 having one end opening into the mixing tank 102 is extended through the central portion of the filter disk 16 to send the submicron particles stirred and dispersed by the compressed air from the mixing tank 102. The extremity 107a of the second air supply pipe 107 is inserted in the feed pipe 119 to suck the submicron particles 115 into the feed pipe 19 by the use of a negative pressure produced by blowing the compressed air through the second air supply pipe 107 so as to mix the submicron particles 115 in the compressed air and to transport the submicron particles 115 by the compressed air. The feed pipe 119 is extended into the deposition vessel 103 and is provided at its extremity with a nozzle 120. A vibrator 121 provided on the feed pipe 119 prevents the deposition of the submicron particles 115 in the feed pipe 119.

The feed pipe 119 is a flexible tube, such as an urethane tube, a nylon tube or a vinyl tube. The feed pipe 119 is extended in a gentle curve without forming sharp bends. The pipes are joined without forming any step at the junctions so that air may not stagnate in the junctions and the submicron particles 115 may not accumulate to clog the pipes.

Air jets 122 are formed around the feed pipe 119 in the bottom wall of the mixing tank 102. Part of the compressed air supplied through the first air supply pipe 106 is jetted through the air jets 122 to produce turbulent air currents around the open end 119*a* of the feed pipe 119 to stir the submicron particles 115 violently.

A stirring mechanism 124 is attached to the bottom surface of the valve element 113. The stirring mechanism 124 comprises a rotary shaft 123 journaled on the valve element 113, an arm 124*a* projecting from the rotary shaft 123, a frame 124*b* formed of a metal wire or the like, and a brush 124*c* attached to the lower end of the frame 124*b*. The rotary shaft 123 is driven for rotation to crush agglomerates of the submicron particles 115 in the mixing tank 102.

A particle collector 125 is disposed over the feed pipe 119 within the mixing tank 102. A particle collecting recess 125*a* of a trapezoidal cross section is formed in the bottom surface of the particle collector 125 opposite to the open end 119*a* of the feed pipe 119. The upper half portion of the particle collector 125 is formed in a filter 125*b* of a porous material. The filter 125*b* is connected to the exhauster 104 by a pipe 126. The pipe 126 is provided with a solenoid valve 127 and a flow control valve 128 to control the flow and flow rate of exhaust air through the pipe 126.

The exhauster 104 has a filter 129 and a suction fan 130. The suction fan 130 sucks air through the pipe 126 and the filter 129 from the mixing tank 102 and discharges the air through an air outlet 131 after purifying the air by the filter 129. The submicron particles arrested by the filter 129 are collected in a pit 132 formed under the filter 129.

Dehumidifying means 133, such as silica gel, and heating means 134, such as a heater, are provided in the upper portion of the interior of the mixing tank 102 to keep the submicron particles 115 dry within the mixing tank 102 so that the submicron particles 115 may not agglomerate.

The nozzle 120, which corresponds to the nozzle 3 shown in FIG. 1B attached to the extremity of the feed pipe 119 connected to the mixing tank 102 is held within the deposition vessel 103. A workpiece 136, i.e. the ferrite substrate shown in FIG. 2A, is disposed opposite to the nozzle 120.

The workpiece 136 is surrounded with the side wall of a suction funnel 139 to prevent the scatter of the submicron particles 115 in the deposition vessel 103. The scatter of the submicron particles 115 in the deposition vessel 103 allows the submicron particles 115 to escape outside the deposition vessel 103 when the door of the deposition vessel 103 is opened and reduces particle recovering efficiency.

The deposition vessel 103 also has a funnel-form bottom wall. A return pipe 140 is connected to the bottom wall of the deposition vessel 103. The return pipe 140 is connected together with a return pipe 141 connected to the suction funnel 139 to the cover 112 of the hopper 111. Vibrators 142, such as bimorph devices, are provided on the bottom wall of the deposition vessel 103 to rapidly discharge the submicron particles 115 deposited over the inner surface of the bottom wall from the deposition vessel 103.

Also connected to the cover 112 is an exhaust pipe 143 connected together with the pipe 126 to the exhauster 104. An annular partition wall 144 extends downward from the inner surface of the cover 112. The partition wall 144 separates the submicron particles delivered through the return pipes 140 and 141 from air on the principle of a cyclone separator and classifies the submicron particles roughly, so that the submicron particles fall in the hopper 111. On the other hand, the air separated from the submicron particles flows through the exhaust pipe 143 into the exhauster 104 and is discharged from the exhauster 104. A solenoid valve 145 is provided on the exhaust pipe 143 to control the flow of air.

In operation, the air compressor 101 discharges compressed air into the first air supply pipe 106 and the second air supply pipe 107. The compressed air discharged into the first air supply pipe 106 flows through the filter disk 116 and the air jets 122 into the mixing tank 102 to stir the submicron particles 115 and, consequently, some of the submicron particles are collected around the open end 119 of the feed pipe 119 by the use of the particle collecting recess 125*a* of the particle collector 125.

The mechanical dispersion of the submicron particles 115 by the vibrators 117 effectively maintains the stirring effect of the compressed air. The solenoid valve 127 provided on the pipe 126 connected to the particle collector 125, and the solenoid valve 145 provided on the exhaust pipe 143 connected to the cover 112 of the hopper 111, are alternately opened at a fixed period. The vibratory variation of pressure in the mixing tank 102 caused by the alternate opening of the solenoid valves 127 and 145 further enhances the stirring effect of the compressed air. When the flow rate of air flowing out from the mixing chamber 102 is reduced to a fixed value by operating the flow control valve 128, the range of pressure variation is narrowed, so that the submicron particles 115 are blown at a substantially fixed rate regardless of the alternate opening of the solenoid valves 127 and 145.

On the other hand, the compressed air discharged into the second air supply pipe 107 flows directly into the feed pipe 119 to produce a negative pressure in the feed pipe 119 and, consequently, the submicron particles 115 collected around the open end 119*a* of the feed pipe 119 are sucked into the feed pipe 119 and are mixed in the compressed air within the feed pipe 119.

Then, the mixture of the compressed air and the submicron particles flows through the feed pipe 119 and is blown through the nozzle 120 against the surface of the workpiece 136 for deposition. The submicron particles 115 are blown preferably at a flying velocity of 50 m/sec or higher, and more preferably, at a flying velocity of 50 km/sec or higher.

The submicron particles which have not been deposited ar returned through the pipes 140 and 141 to the hopper 111 for recirculation.

After filling up the track width regulating grooves 1a and the coil groove 1b with the nonmagnetic material 4 by the blowing apparatus, the excessive deposition of the nonmagnetic material 4 is removed and the surface of the soft magnetic metal thin film 2 is exposed by polishing, and the nonmagnetic material 4 filling up the coil groove 1b is removed to form a coil groove 1c as shown in FIG. 1C.

Then, the pair of substrates 1 are joined together as shown in FIG. 1D and are bonded together by low-temperature metal diffusion.

Figure 4:
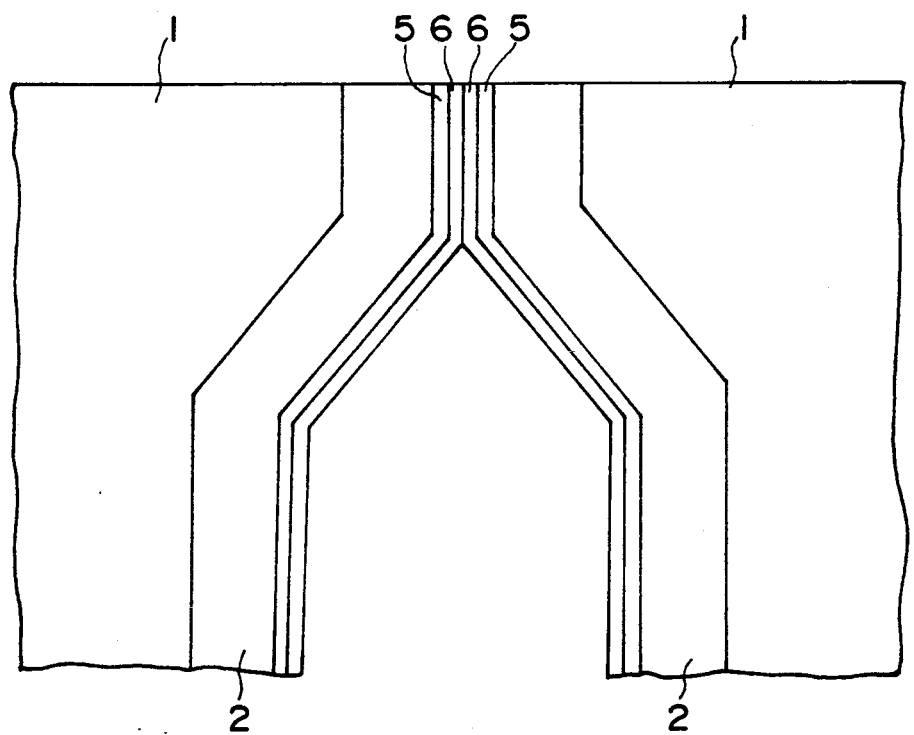
FIG. 4 is an enlarged sectional view of an essential portion of a pair of substrates joined together by low-temperature metal diffusion.

In bonding the substrates 1 together by low-temperature metal diffusion as shown in FIG. 4, a first metal layer 5 and a second metal layer 6 are formed over the soft magnetic metal thin films 2 of each of the substrates 1, the substrates 1 are put together with the second metal layers 6 in contact, and then the substrates 1 are heated at a temperature in the range of 150° to 300° C. while the substrates 1 are pressed against each other by a pressure in the range of 1 MPa to 100 MPa (Mega Pascal). The second metal layers 6 are formed of a material subject to thermal diffusion, such as Au, Ag or Pd. In view of adhesion, the first metal layers 5 are formed of a metal, such as Cr or Ti. A base layer, such as a $SiO_2$ layer, may be formed under the first metal layer 5.

In an experimental fabrication of magnetic heads, the first metal layer 5 was formed of Cr, the second metal layer was formed of Au, and the combined substrates 1 were heated at 250° C. for one hour in a vacuum of $10^{-6}$ torr while the substrates 1 were pressed against each other by a pressure of 100 $kgf/cm^2$.

A structure thus formed by thus joining together the substrates 1 is sliced to obtain magnetic heads as shown in FIG. 2.

The magnetic head has the track width regulating grooves 1a filled with the nonmagnetic material 4 on the opposite sides of the magnetic gap g, and the magnetic head is less subject to partial abrasion.

Example 2

In manufacturing a magnetic head by a magnetic head manufacturing method in a second embodiment according to the present invention, a nonmagnetic material is blown into grooves from a position on the side of the surface of the substrates to be in sliding contact with a magnetic recording medium to fill up the grooves with the nonmagnetic material after joining together a pair of ferrite substrates.

Figure 5A:
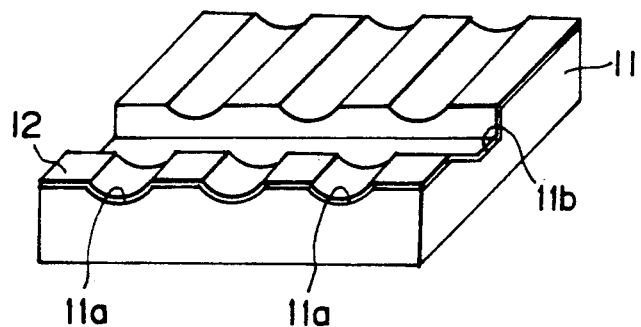
FIGS. 5A to 5C are schematic perspective views for assisting in explaining steps of a magnetic head manufacturing method in a second embodiment according to the present invention.

As shown in FIG. 5A, track width regulating grooves 11a and coil grooves 11b are formed in a pair of ferrite substrates 11, respectively, and then soft magnetic metal thin films 12 are formed over the joining surfaces of the ferrite substrates 11.

Figure 5B:
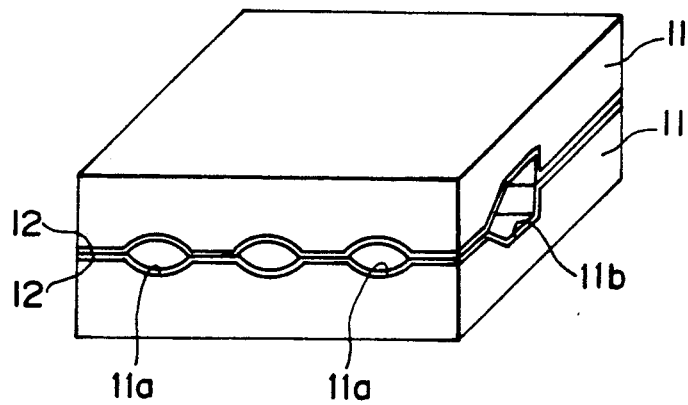

As shown in FIG. 5B, the ferrite substrates 11 are joined together to form a gap by a low-temperature metal diffusion process similar to that employed in the first embodiment.

A nonmagnetic material is blown into the grooves from a position on the side of the surface of the joined ferrite substrates 1 to be in sliding contact with a magnetic recording medium.

Figure 5C:
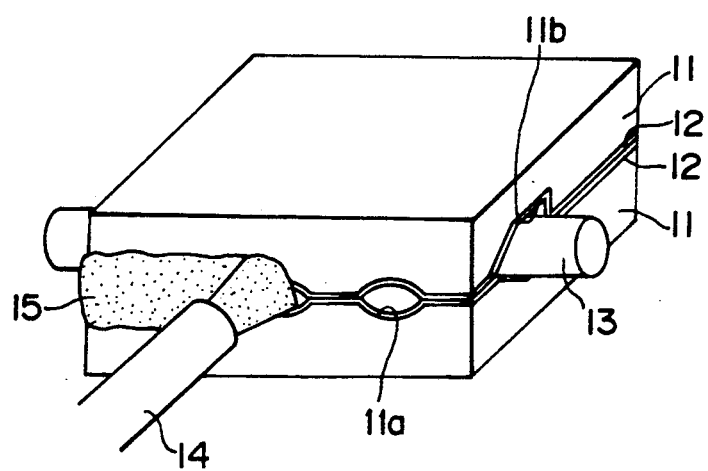

As shown in FIG. 5C, a stopper 13 is inserted in the coil groove 11b of the joined ferrite substrate 11, and then a nonmagnetic material 15 is blown through a nozzle 14. The blowing apparatus and blowing conditions employed in the first embodiment may be applied to the nonmagnetic material 15. Preferably, the stopper 13 is formed of a material capable of being dissolved in and removed by a solvent, such as a wax, for example, a stick wax or electron wax (Nikka Seiko K.K.). Since the wax has a low softening point, the stopper 13 formed of such a wax can partly be softened by heating at a temperature in the range of 60° to 70° C. so that the stopper 13 can be provided in a fixed fashion in the coil groove 11b. Thus, the nonmagnetic material 15 can be stably deposited by blowing.

Figure 6:
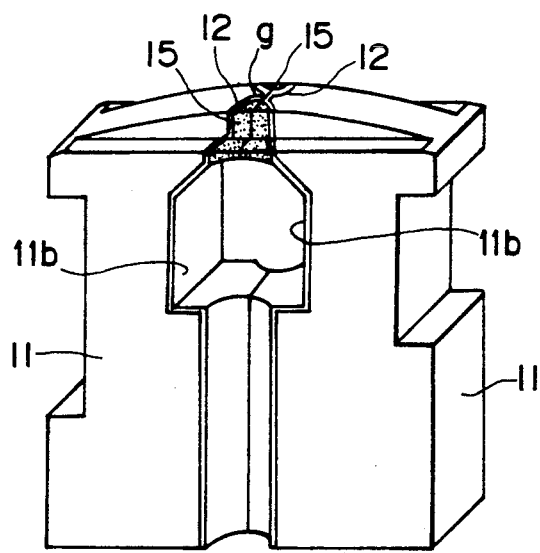
FIG. 6 is a schematic perspective view of a magnetic head manufactured by the magnetic head manufacturing method of the second embodiment.

After the completion of deposition of the nonmagnetic material 15, the surface of the structure of the ferrite substrates 11 to be brought into contact with a magnetic recording medium is subjected to a rounding machining, the stopper 13 is removed by washing the structure by a solvent, and the structure is sliced to obtain magnetic heads as shown in FIG. 6.

The magnetic head is provided with the track width regulating grooves 11a filled with the nonmagnetic material 15 on the opposite sides of the magnetic gap g, respectively. This magnetic head also is less subject to partial abrasion.

Since the magnetic head can be fabricated by the combined use of low-temperature metal diffusion and nonmagnetic material deposition by blowing, no high-temperature heat treatment is necessary. Accordingly, there is a large degree of freedom in the selection of a material for forming the soft magnetic metal thin film 2 or the soft magnetic metal thin film 12.

As is apparent from the foregoing description, according to the present invention, the grooves are filled up with the nonmagnetic material by blowing the nonmagnetic material into the grooves. Therefore, the nonmagnetic material may have a high abrasion resistance, and the magnetic head is less subject to the adverse effect of partial abrasion than the magnetic head filled with glass. Thus, the magnetic head manufacturing method is capable of manufacturing a magnetic head having a high output capacity.

The use of low-temperature metal diffusion for joining the substrates in combination with blowing eliminates high temperature heat treatment, so that the magnetic core may be formed of an amorphous material having a low crystallization temperature. Thus, the magnetic head manufacturing method in accordance with the present invention fully utilizes the advantage of low-temperature metal diffusion for manufacturing a magnetic head having excellent electromagnetic conversion characteristics.

Although various minor changes and modifications might be proposed by those skilled in the art, it will be understood that we wish to include within the claims of the patent warranted hereon all such changes and modifications as reasonably come within out contribution to the art.

We claim as our invention:

1. A method for manufacturing a magnetic transducer head, comprising the steps of:
   providing a pair of magnetic core members shaped to provide a magnetic gap extending up to a tape running surface of the head when they are bonded together, said magnetic gap having a width corresponding to a recording track width on a travelling magnetic recording medium, said width being smaller than a thickness of said core members;

providing in each magnetic core member a groove at each opposite end of the magnetic gap so as to define said width of the magnetic gap corresponding to said recording track width, said grooves running towards and terminating at said running surface of the head;

blowing with air pressure nonmagnetic powder material into said grooves such that the powder material creates a deposition which fills said grooves but not said gap;

removing excess nonmagnetic powder alongside said grooves so that substantially no nonmagnetic powder is present in said gap; and bonding the core members together in a relatively low temperature process which does not substantially affect magnetic characteristics of the core members.

2. A method according to claim 1 including the steps of forming a metal layer over a bonding surface of each core member prior to deposition of the nonmagnetic powder, depositing the nonmagnetic powder by blowing onto the respective metal layers, and then bonding said two core members together by low temperature metal diffusion by applying a pressure to said core members at said relatively low temperature.

3. A method according to claim 1 wherein said nonmagnetic powder has an average particle size between 0.1 and 3 μm.

4. A method according to claim 1 wherein said nonmagnetic powder is blown into said grooves with an incident angle between 0° and 10° relative to a bonding surface of said core members.

5. A method according to claim 2 wherein said metal layers are formed of one of Au, Ag, or Pd.

6. A method according to claim 2 wherein said bonding pressure is between 1 mpa and 100 mpa, and said elevated temperature is between 150° and 300° C.

7. A method according to claim 2 wherein two metal layers are provided on the bonding surface of each respective core member.

8. A method according to claim 1 wherein said low temperature bonding is at a temperature which is relatively low and is not required for melting of the nonmagnetic powder.

9. A method for manufacturing a magnetic transducer head, comprising the steps of:

providing a pair of magnetic core members shaped to provide a magnetic gap extending up to a tape running surface of the head when they are bonded together, said magnetic gap having a width corresponding to a recording track width on a travelling magnetic recording medium, said width being smaller than a thickness of said core members;

providing in each magnetic core member a groove at each opposite end of the magnetic gap so as to define said width of the magnetic gap corresponding to said recording track width, said grooves running towards and terminating at said running service of the head;

bonding the core members together in a relatively low temperature process which does not substantially affect magnetic characteristics of the core members, said grooves overlying each other so as to form closed apertures at each end of the gap;

blowing with air pressure nonmagnetic powder material into said apertures such that the powder material creates a deposition which fills said apertures but does not extend into said gap; and removing excess nonmagnetic powder alongside said grooves at said running surface so that substantially no nonmagnetic powder is present at said gap.

10. A method according to claim 9 including the steps of forming a metal layer over a bonding surface of each core member prior to bonding the core members together, bonding the two core members together by low temperature metal diffusion by applying a pressure to said core members at said relatively low temperature, and then blowing the nonmagnetic powder onto portions of the metal layers extending into said apertures.

11. A method according to claim 9 wherein said nonmagnetic powder has an average particle size between 0.1 and 3 μm.

12. A method according to claim 10 wherein said metal layers are formed of one of Au, Ag, or Pd.

13. A method according to claim 10 wherein said bonding pressure is between 1 mpa and 100 mpa, and said elevated temperature is between 150° and 300° C.

14. A method according to claim 10 wherein two metal layers are provided on the bonding surface of each respective core member.

15. A method according to claim 9 wherein said low temperature bonding is at a temperature which is relatively low and is not required for melting of the nonmagnetic powder.

16. A method according to claim 9 wherein prior to blowing the nonmagnetic powder in the apertures, means for filling a winding aperture formed between said bonded core members is provided for preventing the winding aperture from filling up during the blowing of the nonmagnetic powder into the apertures, said apertures being in communication with said winding aperture.

17. A method for manufacturing a magnetic transducer head, comprising the steps of:

providing a pair of magnetic core members shaped to provide a magnetic gap extending up to a tape running surface of the head when they are bonded together, said magnetic gap having a given width;

providing in each magnetic core member a groove at each opposite end of the magnetic gap so as to define said given width of the magnetic gap, said grooves running towards and terminating at said running service of the head;

blowing with air pressure nonmagnetic powder material into said apertures such that the powder material creates a deposition which fills said grooves but not said gap;

removing excess nonmagnetic powder alongside said grooves so that substantially no nonmagnetic powder is present at said gap;

bonding the core members together in a relatively low temperature process which does not substantially affect magnetic characteristics of the core members.

18. A method for manufacturing a magnetic transducer head, comprising the steps of:

providing a pair of magnetic core members shaped to provide a magnetic gap extending up to a tape running surface of the head when they are bonded together, said magnetic gap having a given width;

providing in each magnetic core member a groove at each opposite end of the magnetic gap so as to define said given width of the magnetic gap, said grooves running towards and terminating at said running service of the head;

bonding the core members together in a relatively low temperature process which does not substantially affect magnetic characteristics of the core members, said grooves overlying each other so as to form apertures at each end of the gap;

blowing with air pressure nonmagnetic powder material into said apertures such that the powder material creates a deposition which fills said apertures but does not extend into said gap; and removing excess nonmagnetic powder alongside said grooves at said running surface so that substantially no nonmagnetic powder is present at said gap.

* * * * *